Oct. 22, 1963    E. B. DICKISON ET AL    3,107,432
GAUGING AND RECORDING APPARATUS
Filed June 9, 1960    6 Sheets-Sheet 1

INVENTORS
E. B. DICKISON
W. C. GRAVES
R. E. PURDY
BY H. J. Winegar
ATTORNEY

Oct. 22, 1963    E. B. DICKISON ET AL    3,107,432
GAUGING AND RECORDING APPARATUS
Filed June 9, 1960    6 Sheets-Sheet 2

INVENTORS
E. B. DICKISON
W. C. GRAVES
R. E. PURDY
BY H. J. Winegar
ATTORNEY

Oct. 22, 1963  E. B. DICKISON ET AL  3,107,432
GAUGING AND RECORDING APPARATUS
Filed June 9, 1960  6 Sheets-Sheet 3

INVENTORS
E. B. DICKISON
W. C. GRAVES
R. E. PURDY
BY H. J. Winger
ATTORNEY

Oct. 22, 1963   E. B. DICKISON ET AL   3,107,432
GAUGING AND RECORDING APPARATUS
Filed June 9, 1960   6 Sheets-Sheet 4

INVENTORS
E. B. DICKISON
W. C. GRAVES
R. E. PURD
BY H. J. Winegar
ATTORNEY

INVENTORS
E. B. DICKISON
W. C. GRAVES
R. E. PURDY

Oct. 22, 1963

E. B. DICKISON ET AL 3,107,432

GAUGING AND RECORDING APPARATUS

Filed June 9, 1960

INVENTORS
E. B. DICKISON
W. C. GRAVES
R. E. PURDY

BY H. J. Winegar
ATTORNEY

United States Patent Office 3,107,432
Patented Oct. 22, 1963

3,107,432
GAUGING AND RECORDING APPARATUS
Earl B. Dickison and William C. Graves, Indianapolis, and Ralph E. Purdy, Lawrence, Ind., assignors to Western Electric Company, Incorporated, New York, N.Y., a corporation of New York
Filed June 9, 1960, Ser. No. 35,035
12 Claims. (Cl. 33—143)

This invention relates to gauging and recording apparatus, and more particularly to apparatus for measuring dimensions of articles and displaying the measurements of the articles graphically.

In the manufacture of telephone receivers, it is necessary to form receiver magnets having predetermined dimensions within close tolerance to insure the mating of the magnets with other parts of the receivers. To satisfy these requirements, the dimensions of the receiver magnets must be checked and controlled closely during the manufacture thereof to insure that the required tolerances are met. It has been observed that, although the dimensions of individual receiver magnets may fall within an allowable range of tolerances, the majority of dimensions of the magnets tend to approach one or the other of the limits of the tolerance range rather than vary about the nominal dimension, because of the tendency of tools of manufacturing machines, such as grinders, to wear out during the manufacture of the receiver magnets.

Accordingly, there is a need to provide an apparatus for gauging the critical dimensions of receiver magnets and for simultaneously displaying the measurements graphically to enable an operator to see at a glance whether the measurements fall within the tolerance range and to determine a trend in deviation of the measurements from a predetermined nominal dimension taken as a standard. It has been found desirable to provide such apparatus with means whereby such measurements and deviations are displayed individually for each receiver magnet and also cumulatively for a group of a predetermined number of the receiver magnets.

It is an object of the invention to provide new and improved gauging and recording apparatus.

It is a further object of the invention to provide new and improved gauging and recording apparatus for measuring dimensions of articles and displaying the measurements of the articles graphically.

It is a still further object of the invention to provide new and improved gauging and recording apparatus for simultaneously displaying a series of measurements of individual articles and an average of the measurements of a group of articles graphically.

Apparatus illustrating certain features of the present invention may include gauging means for making a predetermined series of individual measurements. First means are provided responsive to said gauging means for recording a series of individual indicia, each providing a visual indication of the magnitude of the corresponding individual measurement. Also provided are second means actuated by the first recording means for recording at the completion of the series of measurements an indicium providing a visual indication of the mean of the magnitudes of said individual measurements.

Other objects and aspects of the present invention will become more readily understood from the following detailed description of a specific embodiment thereof when read in conjunction with the appended drawings, in which:

FIG. 5 is an enlarged fragmentary side view of a portion of the gauging mechanism illustrated in FIG. 4;

Figure 1:
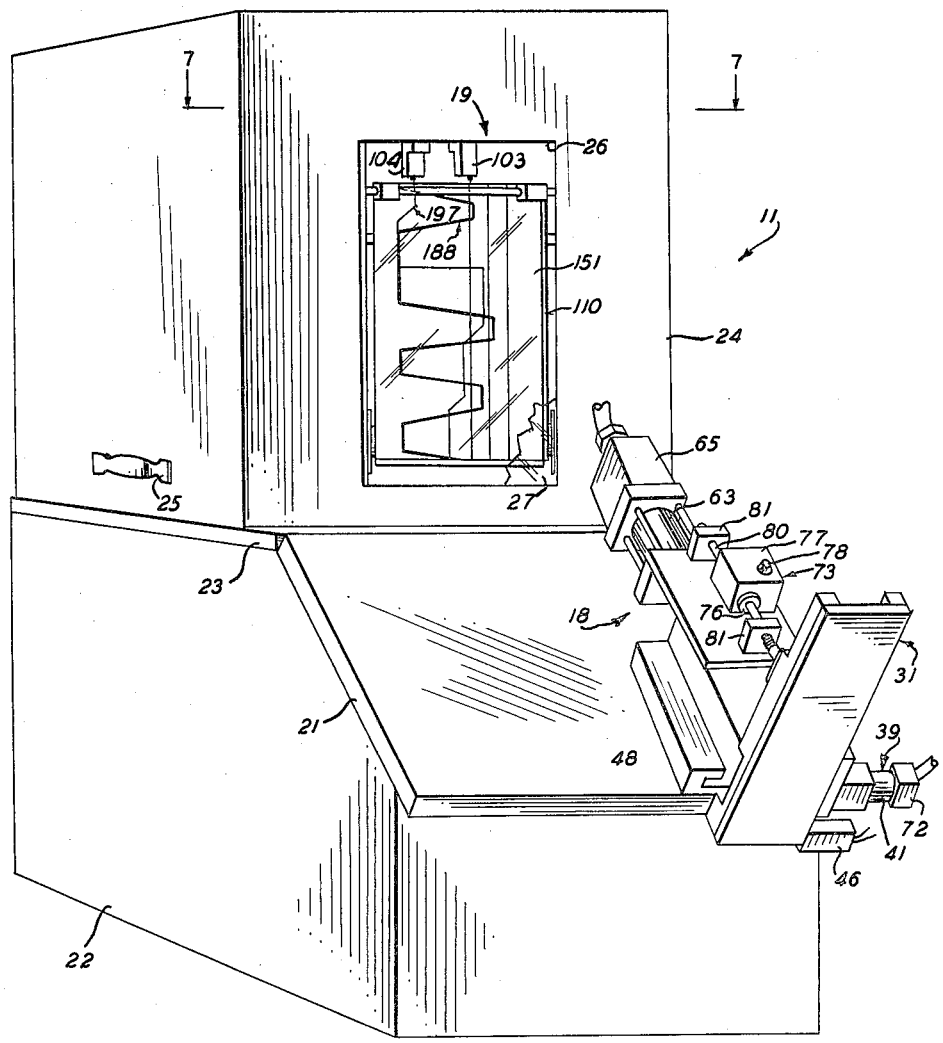
FIG. 1 is a perspective view of gauging and recording apparatus embodying certain features of the present invention.
Figure 2:
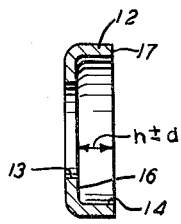
FIG. 2 is a sectional view of a receiver magnet.

Referring now to the drawings and more particularly to FIG. 1 thereof, there is shown gauging and recording apparatus, designated generally by the numeral 11, for measuring the dimensions of a series of articles, such as a group of five receiver magnets 12—12, and for graphically displaying the measurements thereof. The receiver magnet 12 is in the form of a short cylinder provided with a bore 13 and a counterbore 14 axially aligned with the bore and forming a shoulder 16. In the exemplary embodiment illustrated, the apparatus 11 is designed to measure the depth of the counterbore 14 of each of the receiver magnets 12—12, designated in FIG. 2 as a dimension "$h \pm d$," the distance between the shoulder 16 and a face 17 of the receiver magnet 12, where "$h$" is a desired nominal depth and "$d$" is a maximum allowable deviation from the nominal depth. The apparatus 11 is also designed to graphically display the measurements and deviations from the nominal depth "$h$" of the counterbore 14, to determine whether each of the individual receiver magnets and also all of the magnets in the group satisfy the required tolerance conditions.

Figure 7:
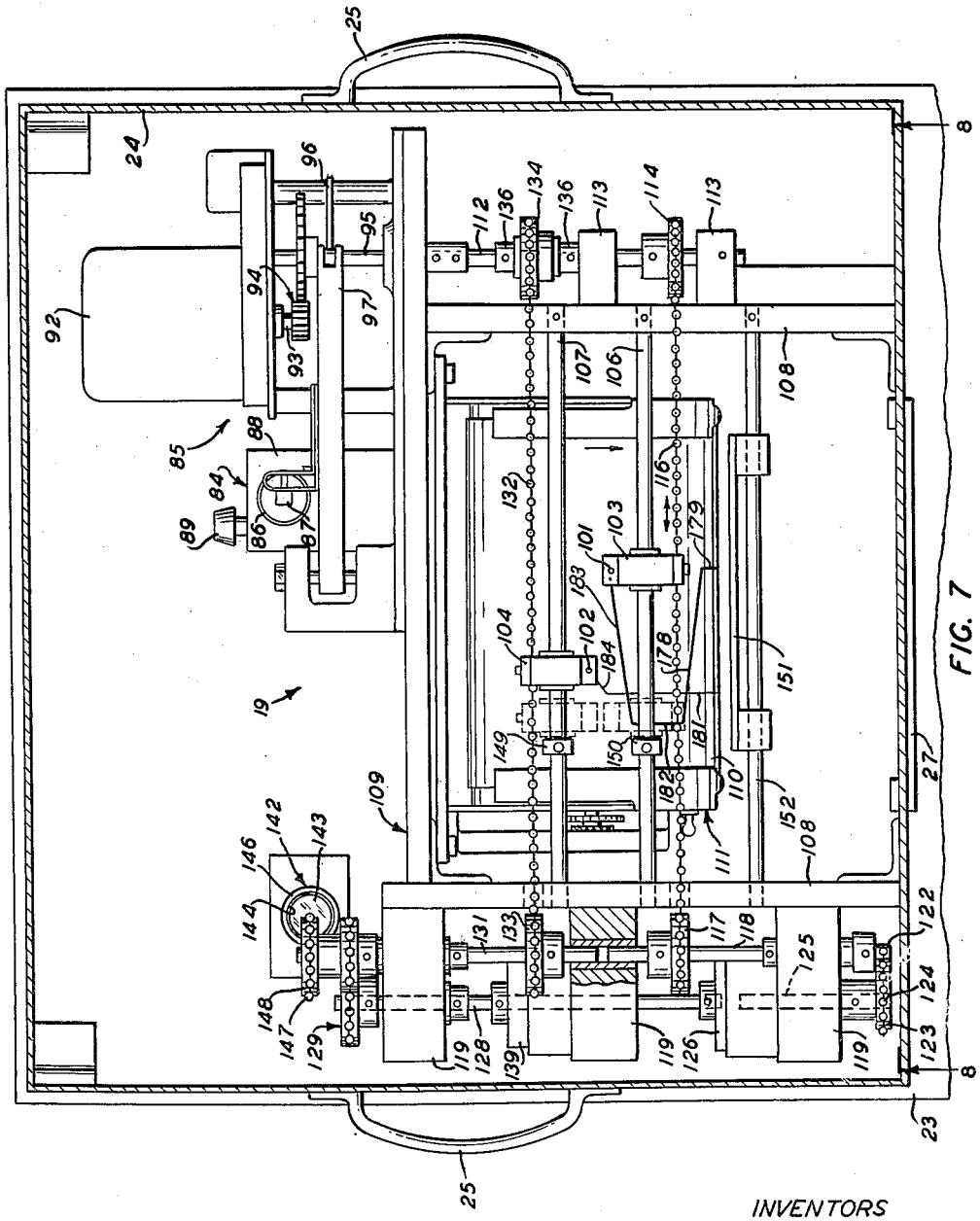
FIG. 7 is an enlarged, horizontal section taken along the line 7—7 of FIG. 1, showing a recording mechanism forming a part of the gauging and recording apparatus with portions broken away for clarity.

The apparatus 11 includes a gauging mechanism designated generally by the numeral 18, and a recording mechanism, designated generally by the numeral 19. The gauging mechanism 18 is mounted securely on an inclined support plate 21, which forms a portion of a support 22. The recording mechanism 19 is mounted on a base plate 23 supported generally horizontally on the support 22 and is enclosed by a removable cabinet 24. A pair of handles 25—25, shown in FIGS. 1 and 7, are provided on the cabinet 24 to facilitate the removal of the cabinet from the base plate 23 to facilitate access to the recording mechanism 19. The cabinet 23 is provided with a window 26 in the front portion thereof covered by a transparent pane 27 (FIG. 7), such as a transparent glass or plastic plate, to allow visual observation of recordations made by the recording mechanism 19 while keeping the recording mechanism substantially protected from dust and the like.

Gauging Mechanism 18

Referring in detail to the gauging mechanism 18, and particularly to FIGS. 3, 4, 5 and 6, five of the receiver magnets 12—12, only four of which are shown, are placed by an operator into a chute, designated generally by the numeral 31, in stacked alignment. A plate 32 encloses the chute 31 along most of its length to insure proper positioning of the receiver magnets 12—12 in the chute for a gauging operation. The lower end of the chute 31 is enclosed by a spacer 33 which limits downward movement of the receiver magnets 12—12. A circular aperture 34 is provided at the lower end of the plate 32 of the chute 31 to allow gauging of the lowermost of the receiver magnets 12—12.

Passages 36 and 37 (FIG. 6) are formed in the lower end of the chute 31 to allow ejection of the receiver magnets 12—12 after the gauging operation. A pusher head 38 of an ejector mechanism, designated generally by the numeral 39, is normally positioned in the passage 37 in such a manner that the pusher head acts as a guide for the receiver magnets 12—12 descending through the chute 31 during the positioning of the magnets in axial alignment with the aperture 34. The ejector mechanism 39 includes an air cylinder 41 having a spring-biased, normally retracted piston rod 42, which carries at the free end thereof the pusher head 38. The ejector mechanism 39 is operated at the end of a gauging operation on each receiver magnet 12 to eject the receiver magnet after the gauging operation from the gauging position in the chute 31 into a carrying tray (not shown).

The lowermost of the receiver magnets 12—12 positioned in the chute 31 contacts an actuating arm 44 of a normally open sensing switch 46. The sensing switch 46 is provided to detect the presence of a receiver magnet 12 to be gauged in the chute 31 in the gauging position and to actuate electrical control means, which are described hereinafter in detail in connection with the control circuit and operation of the apparatus.

A gauging head, designated generally by the numeral 47, forming part of the gauging mechanism 18, is mounted slidably on the support plate 21 by means of slide guides 48—48 for reciprocating movement axially of the aperture 34 in the chute 31. The gauging head includes a gauging element 49, which is in the form of an elongated cylinder having a reduced stem portion 52 provided thereon, mounted slidably in a stepped bore 53 in the gauging head 47 by means of bushings 54 and 56.

A cylindrical clamping member 57 is secured in the stepped bore 53 coaxially surrounding the gauging element 49 in such a manner that the clamping member protrudes beyond a forward face 58 of the gauging head 47. When the gauging head 47 is in the gauging position, shown in FIG. 3, the clamping member 57 clamps the receiver magnet 12 against the rear wall of the chute 31 in the gauging position. In this manner the possibility of inaccurate measurements by the gauging element 49, which during the gauging operation is positioned axially of the counterbore 14 of the receiver magnet 12 in abutting contact with the shoulder 16 thereof, due to the vertical misalignment of the receiver magnet in the chute 31, is eliminated.

Figure 3:
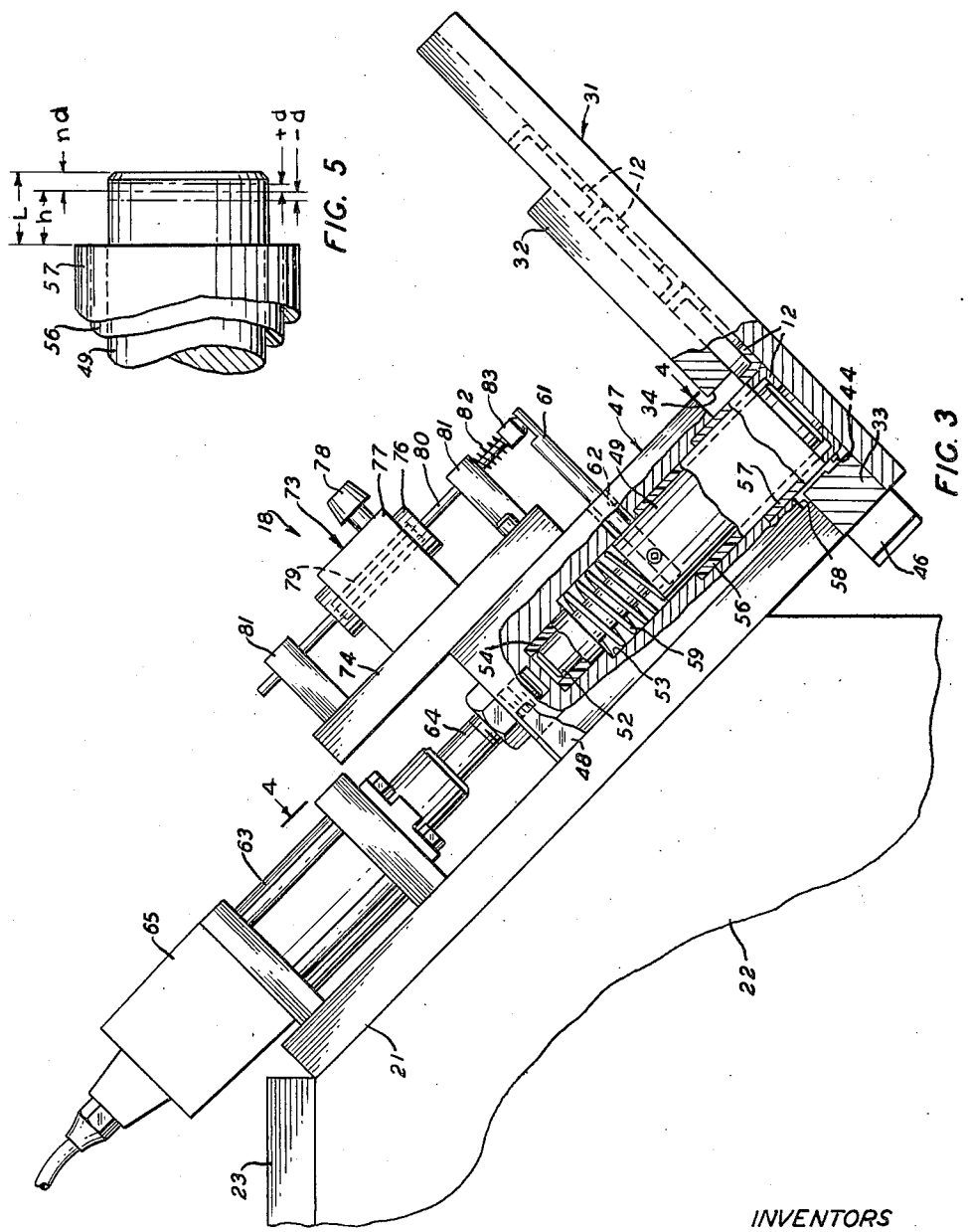
FIG. 3 is an enlarged, side elevation of a gauging mechanism forming a part of the apparatus illustrated in FIG. 1 with parts thereof broken away for clarity.
Figure 4:
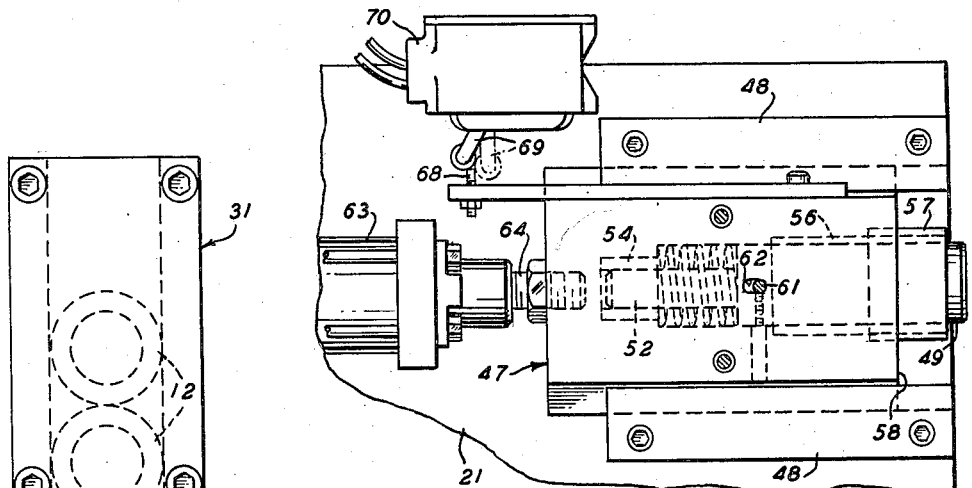
FIG. 4 is a fragmentary section taken along the line 4—4 of FIG. 3, but illustrating portions of the gauging mechanism in a retracted position.
Figure 6:
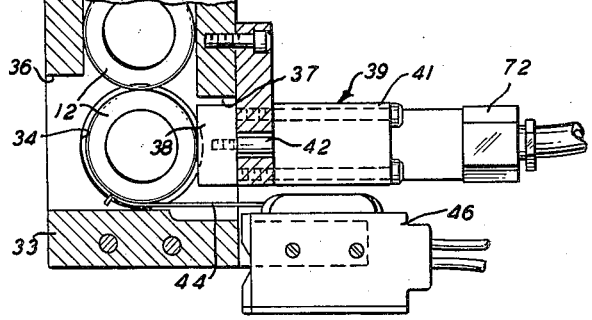
FIG. 6 is a fragmentary end view of the gauging mechanism with portions thereof broken away for clarity.

A compression spring 59, positioned coaxially about the stem portion 52 of the gauging element 49, normally urges the gauging element outwardly of the gauging head 47 from left to right, as shown in FIGS. 3 and 4. The gauging element 49 normally extends beyond the clamping member 57 a distance "L" (FIG. 5), which is equal to $h+nd$, where "$n$" is any arbitrarily chosen number greater than unity, selected to insure the contact of the gauging element 49 with the shoulder 16 of a magnet 12 during the gauging operation.

An arm 61, one end of which is secured by suitable means, such as a screw, to the gauging element 49, extends through an elongated aperture 62 in the gauging head 47. The arm 61 limits the outward movement of the gauging element 49 under the urging action of the spring 59, so that the gauging element always protrudes the same predetermined distance "L" (FIG. 5) beyond the clamping member 57 when the gauging head 47 is in its retracted position, shown in FIG. 4. The aperture 62 is provided with sufficient clearance to allow an overtravel of the gauging element 49 and, therefore, the arm 61 beyond an $h-d$ position with respect to the clamping member 57.

Figure 9:
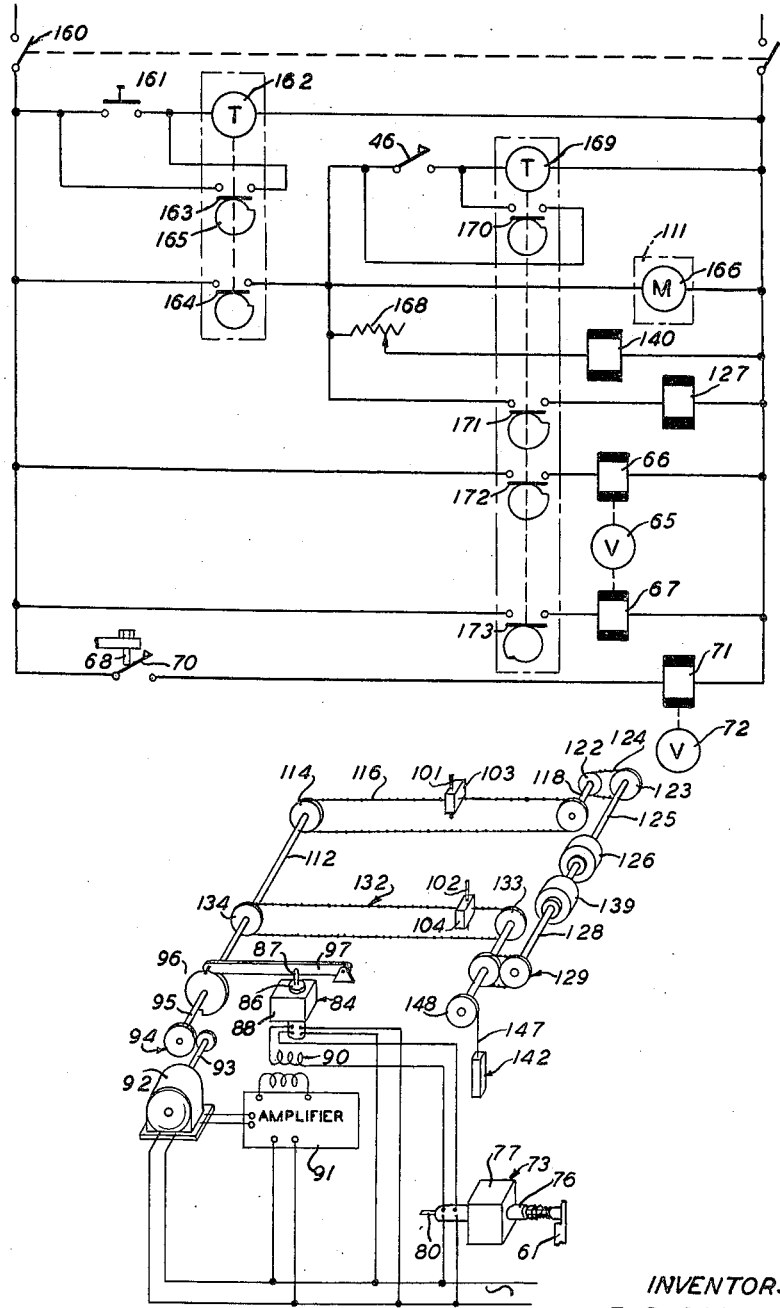
FIG. 9 is a schematic diagram of an electrical control circuit for the gauging and recording apparatus.

An air cylinder 63 is mounted securely on the support plate 21 axially of the gauging head 47. A piston rod 64 is operatively connected to the gauging head 47, so that the gauging head may be moved with the piston rod between the retracted position, shown in FIG. 4, and an extended position, shown in FIG. 3. A valve 65, connected to a suitable supply of fluid under pressure (not shown) and actuated by an advance solenoid 66 and a retract solenoid 67 (FIG. 9), is used to control the movement of the piston rod 64 between the extended and retracted positions, respectively.

A lug 68, mounted on the gauging head 47, operates, during the return stroke of the gauging head, a trip arm 69 to close a normally open ejector switch 70. The ejector switch 70, upon closing, energizes an ejector solenoid 71 (FIG. 9), which actuates a control valve 72, connected to a suitable supply of fluid under pressure (not shown), of the air cylinder 41 of the ejector mechanism 39 to eject the magnet 12 from the gauging position.

An electrical transducer, designated generally by the numeral 73, in the form of a transmitting differential transformer, for example an Atcotran Transmitting Differential Transformer, class 6208, manufactured by the Automatic Timing and Controls, Inc., King of Prussia, Pennsylvania, is mounted on a plate 74. The plate 74 is secured to the gauging head 47 for reciprocable movement therewith. The transmitting differential transformer is an electromechanical device for translating the displacement of a magnetic core into an alternating current voltage, the magnitude of which varies linearly with respect to the displacement of the magnetic core. The transducer 73 includes a coil unit 76 positioned in a mounting block 77 attached to the plate 74. The coil unit 76 is adjustable axially of the mounting block 77 by means of a knob 78. The transducer 73 also includes a movable tubular magnetic core 79 attached to an elongated rod 80 mounted on bearing supports 81—81 for reciprocation coaxially of the coil unit 76.

A compression spring 82 is mounted axially about the rod 80 between an enlarged portion 83 thereof and the bearing support 81. The spring 82 urges the rod 80 and, therefore, the core 79, from left to right, relative to the coil unit 76 to insure that the enlarged portion 83 of the rod 80 is urged resiliently against the free end of the arm 61. It may be seen that any axial movement of the gauging element 49 relative to the clamping member 57 will be transformed by means of the arm 61 into corresponding axial movement of the rod 80 and the core 79 relative to the coil unit 76.

The transducer 73 is designed to detect the amount of axial movement of the gauging element 49 relative to the clamping member 57 by correlating the movement of the core 79 to the movement of the gauging element. A balancing transducer 84, similar to the transducer 73, forms a part of a servo mechanism 85 (FIG. 7), such as an Atcotran Servo Mechanism, class 6170, type 6171-1-2-R. The balancing transducer, which has a coil unit 86 and a magnetic core 87, is mounted in a mounting block 88. The coil unit 86 is adjustable axially of the mounting block 88 by means of a knob 89.

Primary windings of both the transducer 73 and the balancing transducer 84 are connected to a suitable source of A.-C. current. Secondary windings of both the transducer 73 and the balancing transducer 84 are connected in bucking relationship to the secondary windings of a transformer 90. An amplifier 91, such as an Atcotran Amplifier, class 6251, which is connected to a suitable supply of A.-C. current, is connected to primary windings of the transformer 90. When both the transducer 73 and the balancing transducer 84 are producing equal 180° out-of-phase voltages, there is no net input to the amplifier 91 and, therefore, a servomotor 92 of the servo mechanism 85 will be at rest. However, when the core 79 of the coil unit 76 of the transducer 73 is displaced axially of the coil unit 76, during the axial movement of the gauging element 49, unequal 180° out-of-phase voltages will be produced by the transducer 73 and the balancing transducer 84, respectively, so that a restoring signal proportional to the magnitude of the unbalance voltage will be produced in the system, which includes the transducer 73, the servo mechanism 85, the transformer 90, and the amplifier 91.

The restoring signal will cause the servomotor 92 to rotate its output shaft 93. Rotary movement of the output shaft 93 is transmitted by means of a gear train, designated generally by the numeral 94, to a drive shaft 95. A cam 96, mounted securely on the drive shaft 95 for rotation therewith, is in contact with the free end of a pivotable lever 97 which imparts reciprocable movement to the core 87 of the balancing transducer 84 axially thereof. The core 87 will be moved axially of the coil unit 86 of the balancing transducer 84 until the voltages of both the transducer 73 and the balancing transducer 84 are again equal and 180° out-of-phase, so that the restoring signal in the system is again equal to zero.

*Recording Mechanism 19*

Figure 8:
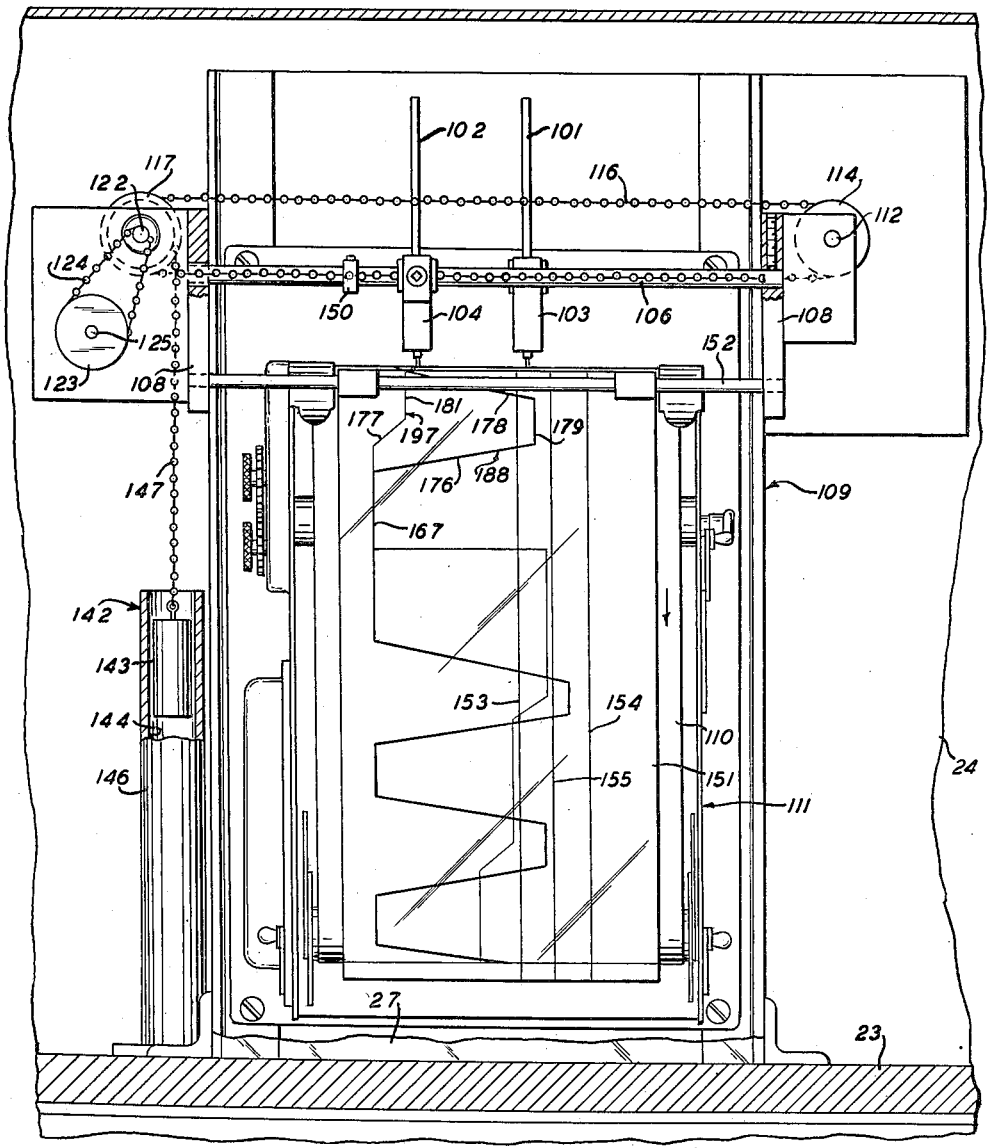
FIG. 8 is a front view of the recording mechanism shown in FIG. 7 with parts of the gauging and recording apparatus broken away for clarity.

The recording mechanism 19, shown in detail in FIGS. 7 and 8, includes a first recording pen 101 and a second recording pen 102 held adjustably in bearing guides 103 and 104, respectively. The bearing guides 103 and 104 are mounted slidably upon guide rods 106 and 107, respectively, which are secured on cross ties 108—108 of a frame, designated generally by the numeral 109, secured to the base plate 23. Each of the recording pens 101 and 102 is adjustable axially in the bearing guides 103 and 104, respectively, to a position where each of the recording pens is in marking contact with a strip of chart paper 110. The chart paper 110 is being moved continuously at a uniform rate past the recording pens 101 and 102, in a direction indicated by an arrow in FIGS. 7 and 8, by suitable electric drive means, designated generally by the numeral 111, such as a synchronous Chart Drive, model AW, series 90, manufactured by the Esterline-Angus Co., Inc., Indianapolis, Ind.

A main shaft 112, mounted rotatably by brackets 113—113 is operatively connected to the drive shaft 95. A sprocket 114, mounted on the main shaft 112 for rotation therewith, meshes with a ball chain 116, which, in turn, meshes with a sprocket 117 mounted on a right-hand shaft 118 supported rotatably by two brackets 119—119. When the servomotor 92 rotates the output shaft 93, the rotation of the output shaft is transformed by means of the gear train 94, the drive shaft 95, the main shaft 112, the sprockets 114 and 117 and the ball chain 116 into the linear movement of the bearing guide 103 along the guide rod 106 and, therefore, of the first recording pen 101 across the chart paper 110 transversely of the direction of advance thereof.

Rotation of the right-hand shaft 118 is transmitted by means of sprockets 122 and 123 and a ball chain 124 to a stub shaft 125 supported by the bracket 119. The diameter of the sprocket 123 is five times as great as the diameter of the sprocket 122 so that for each five revolutions of the right-hand shaft 118, the stub shaft 125 will complete only one revolution. An electromagnetic clutch, designated generally by the numeral 126, is provided with a clutch solenoid 127 (FIG. 9), which, when energized, connects the stub shaft 125 operatively to a shaft 128 supported rotatably by the brackets 119—119. The rotation of the shaft 128 is then transmitted by means of a ball chain and sprocket drive, designated generally by the numeral 129, to a left-hand shaft 131 supported rotatably by the brackets 119—119. A ball chain 132 meshes with a sprocket 133 mounted securely on the left-hand shaft 131 and with a sprocket 134, which is mounted freely rotatably on the main shaft 112 and is retained from sliding thereon by means of collars 136—136.

When the left-hand shaft 131 rotates, the chain 132 imparts linear movement to the bearing guide 104 along the guide rod 107 and, therefore, to the second recording pen 102 across the chart paper 110 from left to right as viewed in FIG. 8. Since the left-hand shaft 131 will complete only one revolution for each five revolutions of the right-hand shaft 118 and, therefore, of the main shaft 112, the second recording pen 102 will move only one fifth as far across the chart paper 110 as the first recording pen 101.

An electromagnetic brake, designated generally by the numeral 139, which has a brake solenoid 140 (FIG. 9), is provided to apply a continuous drag on the shaft 128. The brake 139 prevents any possibility of the movement of the second recording pen 102 when the clutch solenoid 127 is deenergized. However, the drag of the brake 139 is so adjusted as to be sufficient to permit slippage of the clutch 126 at any time when the shaft 128 is connected operatively by the clutch to the stub shaft 125.

A reset mechanism, designated generally by the numeral 142, is provided to move, at the end of a predetermined number of measurements, the second recording pen 102 from right to left, as viewed in FIG. 7, so as to reset the second recording pen 102 back to the starting position. A weight 143 is positioned within a well 144 of a block 146. The weight 143 is attached to one end of a ball chain 147, the other end of which is secured to a sprocket 148 mounted securely on the left-hand shaft 131 so that, as the left-hand shaft rotates, the chain 147 is taken up on the sprocket 148, whereby the weight 143 is raised above the bottom of the well 144 of the block 146.

When, at the end of five measurements, both the brake solenoid 140 of the brake 139 and the clutch solenoid 127 of the clutch 126 are deenergized, the weight 143 will descend by gravity and impart reverse rotation to the sprocket 148 and, therefore, the left-hand shaft 131, whereby the bearing guide 104 and the second recording pen 102 are reset back to their original starting position, shown in phantom lines in FIG. 7. The reverse movement of the bearing guide 104 along the guide rod 107 is limited by a collar 149, mounted adjustably on the guide rod 107 in alignment with a collar 150 mounted adjustably on the guide rod 106 to limit reverse movement of the bearing guide 103. The weight 143 is so selected in relation to the servomotor 83, the clutch 126 and the brake 139, that the weight 143 will be sufficient to reset the second recording pen 102 to its starting position when the brake solenoid 140 is deenergized, but will not apply an undue strain on the servomotor 83 when both the brake solenoid 140 and the clutch solenoid 127 are energized.

A transparent overlay plate 151 made of suitable material, such as glass or clear plastic, is secured on a cross brace 152 in front of the chart paper 110 as viewed in FIGS. 7 and 8. The overlay plate 151 has a pair of spaced parallel lines 153 and 154 running longitudinally thereof, for delineating limits of maximum and minimum deviations, respectively, of an allowable range of deviation "$2d$" of a nominal depth "$h$" of a counterbore of a representative receiver magnet 12 taken as a standard. The nominal depth "$h$" of the counterbore of such a standard receiver magnet 12 is represented by a line 155 located midway between the lines 153 and 154. The line 155 may be moved toward one or the other of the lines 153 and 154 depending on the required tolerances of the articles being measured which may not necessarily be equal, as in this particular example. Instead of providing the overlay plate 151, the chart paper 110 may be provided with lines corresponding to the lines 153, 154 and 155.

*Operation*

At the beginning of the operation it is assumed that the transducer 73 and the balancing transducer 84 are producing equal 180° out-of-phase output voltages. Accordingly, there will be no net input voltage to the amplifier 91 and the restoring signal in the system will be equal to zero so that the servomotor 92 will be at rest. It is also assumed that the main switch 160 is closed. Preparatory to the operation, an operator places five of the receiver magnets 12—12 into the chute 31. When the first of the receiver magnets 12—12 slides down the chute 31 into the gauging position shown in FIGS. 3 and 6, the receiver magnet depresses the actuating arm 44 of the normally open sensing switch 46 whereby the sensing switch is closed. The operator then depresses a start switch 161, shown in FIG. 9, to complete a circuit of a first timer 162, such as an Eagle Multiflex Reset Timer, type HM 204A6, manufactured by the Eagle Signal Company, Moline, Illinois. The first timer 162 includes a series of contacts 163 and 164 operated by spring-biased camming means, designated generally by the numeral 165. During the timing cycle of the first timer, a synchronous motor (not shown) forming part of the timer and operatively connected by means of a solenoid-operated clutch (not shown) to the camming means 165, drives the camming means so that the contacts 163 and 164 are closed thereby sequentially and opened simultaneously at desired intervals of time. When a clutch solenoid (not shown) is deenergized because of the opening of the main switch 160 or because the camming means 165, upon reaching a certain preset position, interrupts the circuit of the clutch solenoid, the camming means 165 is reset by a biasing spring (not shown) to return the contacts 163 and 164 to their normally open position.

Upon closing of the start switch 161 the first timer 162 locks itself in through its holding contact 163, closes its contact 164 and then continues to run a preselected length of time. Since the lowermost of the receiver magnets 12—12 in the chute 31 keeps the sensing switch 46 closed, the closing of the contact 164 completes a circuit through a recorder motor 166. Energization of the recorder motor 166 causes the chart paper 110 to advance continuously past the recording pens 101 and 102 in contact therewith at a constant predetermined rate so that the recording pens 101 and 102, positioned at this time in their normal position in abutment with collars 150 and 149, respectively, trace a single line 167. The contact 164 also completes a circuit through an adjustable resistance 168 in the circuit of the brake solenoid 140. The braking action of the brake 139 is then adjusted, if necessary, by adjusting the resistance 168 to produce a desired degree of drag, sufficient to overcome the resetting torque exerted by the weight 143 on the left-hand shaft 131, but sufficient to permit slippage of the clutch 126, when the clutch solenoid 127 is energized. Simultaneously, the closure of the contact 164 of the first timer 162 completes the circuit of a second timer 169, such as Eagle Multiflex Reset Timer type HM 503A6, manufactured by the Eagle Signal Company, Moline, Illinois. The second timer 169, which is similar in construction to the first timer 162, is provided with contacts 170 to 173, inclusive.

The second timer 169 locks itself in through its holding contact 170 and continues to run for a predetermined fraction of the running time of the first timer 162. In this particular embodiment, the running time of the second timer 169, including its reset time during each cycle, should be somewhat less than one-fifth of the running time of the first timer 162. Accordingly, the second timer 169 can run five times during each cycle of the first timer 162, as long as the sensing switch 46 is closed by a receiver magnet in the chute 31. Simultaneously, with the closing of the contact 170, the second timer 169 closes its contacts 171 and 172. The closing of the contact 171 completes a circuit through the clutch solenoid 127 so that the clutch solenoid 127 is energized, whereby the stub shaft 125 is connected operatively by the clutch 126 to the shaft 128. The closing of the contacts 172 of the second timer 169 causes energization of the advance solenoid 66 of the control valve 65 of the air cylinder 63 of the gauging mechanism 18 to advance the piston rod 64 of the air cylinder 63 and, therefore, the gauging head 47, toward the receiver magnet 12, held in the gauging position in the chute 31, until the clamping member 57 clamps the receiver magnet 12 in the chute 31.

The position of the gauging element 49 within the gauging head 47 is so adjusted that it will engage the shoulder 16 of the receiver magnet 12, being gauged, before the clamping member 57 clamps the receiver magnet 12 in the chute 31. Therefore, the gauging element 49 moves a short distance axially inwardly of the gauging head 47 and causes a corresponding movement of the arm 61. The distance through which the gauging element 49 will move relative to the clamping member 57 will depend on the difference between the distance "L" and the actual depth of each of the receiver magnets 12—12.

The arm 61 will move the rod 80 carrying the core 79 axially of the coil unit 76 of the transducer 73 a distance equal to the distance travelled by the gauging element 49 axially of the gauging head 47. This movement of the core 79 induces a voltage in the coil unit 76, which is directly proportional to the amount of movement of the gauging element 49 relative to the clamping member 57. This induced voltage will be out of balance with the voltage induced in the coil unit 86 of the balancing transducer 84. The resulting differences in the induced voltages in the transducers 73 and 84 will cause a restoring signal in the system. This restoring signal results in the rotation of the servomotor 92, which drives the gear train 94, and, therefore, produces clockwise rotation of the main shaft 112, as viewed in FIGS. 7 and 8, and simultaneously the rotary motion of the cam 96. The rotary motion of the cam 96 results in the pivotable movement of the lever 97 and, therefore, in the linear movement of the core 87 axially of the coil unit 86 of the balancing transducer 84. The operation of the servomotor 92 will continue until the core 87 of the balancing transducer 84 moves to such a position that both the transducer 73 and the balancing transducer 84 again produce equal 180° out-of-phase voltages.

The rotation of the main shaft 112 is transmitted to the sprockets 114 and 117 and the ball chain 116 to produce rotation of the right-hand shaft 118 and linear sliding movement of the bearing guide 103 on the guide rod 106 from left to right, as viewed in FIGS. 7 and 8, and therefore, a corresponding linear movement of he first recording pen 101 with respect to the chart paper 110 moving continuously at a constant predetermined speed underneath the recording pens 101 and 102. Since the first recording pen 101 is moving transversely of the movement of the chart paper 110, an inclined line, such as the line 176 (FIGS. 8 and 10) is produced on the chart paper.

Simultaneously, with the movement of the first recording pen 101, the rotation of the right-hand shaft 118 is transmitted by means of the sprockets 122 and 123 and the ball chain 124 to the stub shaft 125, which is at this time connected by the clutch 126 operatively to the shaft 128. The rotation of the shaft 128 is transmitted by means of the chain and sprocket drive 129 to the left-hand shaft 131. Rotation of the left-hand shaft 131 and, therefore, of the sprocket 133 is transmitted by means of the chain 132 to the sprocket 134 and produces slidable movement of the bearing guide 104 along the guide rod 107 and, therefore, a linear movement of the second recording pen 102 from left to right, as viewed in FIG. 8, transversely of the movement of the chart paper 110, whereby an inclined line 177 (FIGS. 8 and 10) is formed on the chart paper.

Since the diameter of the sprocket 123 is five times as large as the diameter of the sprocket 122, one full revolution of the right-hand shaft 118 will produce only one fifth of a revolution of the stub shaft 125 and, therefore, of the left-hand shaft 131. Accordingly, the second recording pen 102 is advanced across the chart paper 110 only one fifth of the distance advanced thereacross by the first recording pen 101, so that the maximum amplitude of the line 177, with respect to the line 167 taken as a reference line, is equal to one fifth the maximum amplitude of the line 176. However, since the chart paper 110 has moved longitudinally the same predetermined distance relative to both recording pens 101 and 102, the inclination of the line 176 is different than the inclination of the line 177.

After sufficient time has elapsed to measure one of the receiver magnets 12—12, the contact 171 of the second timer 169 is opened by the timer 169 to deenergize the clutch solenoid 127, to prevent further operative connection by means of the clutch 126 between the stub shaft 125 and the shaft 128. Since the brake solenoid 140 is energized during the gauging operation of the whole series of the five receiver magnets 12—12, the brake 139 prevents the weight 143 from falling down by gravity into the well 144 of the block 146 and, therefore, prevents resetting of the second recording pen 102 into its original position, so that the second recording pen 102 is retained in a position reached thereby during the advance stroke of the gauging head 47. Simultaneously with the opening of the contact 171, the second timer 169 opens the contact 172 which results in deenergization of the advance solenoid 66 of the valve 65, and closes its contact 173 which results in the energization of the retract solenoid 67 of the valve 65, so that the piston rod 64 of the air cylinder 63 is retracted.

During the return stroke of the gauging head 47 the gauging element 49 returns back to its normal extended position (FIG. 4) and, therefore, the arm 61 moves from left to right, as viewed in FIGS. 3 and 4, so that the core 79 attached to the rod 80 moves axially relative to the coil unit 76 of the transducer 73 causing rotation of the output shaft 93 of the servomotor 92 in the opposite direction. Therefore, the main shaft 112 now rotates counterclockwise, as viewed in FIGS. 7 and 8, and the bearing guide 103 and, accordingly, the first recording pen 101 now move along the guide rod 106 from right to left, as viewed in FIG. 7. As a result of the movement of the pen 101 to the left, as viewed in FIG. 7, a second inclined line 178 is produced by the first recording pen 101 on the chart paper 110. Sufficient time must elapse to insure that the pen 101 would have reached the end of its travel from left to right, as viewed in FIG. 7, if receiver magnets 12—12 having a preselected maximum depth were being gauged, before the pen 101 is moved from right to left. Therefore, a time delay may occur between the movement of the pen 101 from right to left and the movement of the pen 101 from left to right so that a short flat line 179 may be produced between the lines 176 and 178.

Because the clutch solenoid 127 is deenergized at this time, the rotation of the main shaft 112 is not transmitted to the right-hand shaft 128. Therefore, the second recording pen 102, which is held stationary relative to the chart paper 110 during the time delay and the return movement of the first recording pen 101, traces a line 181 which is parallel to the direction of the movement of the chart paper 110 and, therefore, to the reference line.

When the piston rod 64 of the air cylinder 63 of the gauging mechanism 18 has been retracted, the lug 68 actuates the trip arm 69 of the ejector switch 70 to close the ejector switch 70 whereby the ejector solenoid 71 is energized. The ejector solenoid 71, upon energization, actuates the control valve 72 to operate the air cylinder 41 of the ejector mechanism 39 so that the pusher head 38 of the ejector mechanism is moved inwardly and transversely of the chute 31 to eject the lowermost of the receiver magnets 12—12 from the gauging position in the chute 31 and to open the switch 46 to deenergize the timer 169. The piston rod 42 of the ejector mechanism 39, and, therefore, the pusher head 38 then return to their original positions to permit the next receiver magnet 12 to descend through the chute 31 into the gauging position and depress the actuating arm 44 of the sensing switch 46 to energize the timer 169 and cause the apparatus to continue the gauging operations of the next receiver magnet 12 in the series of five receiver magnets.

During this time, when the gauged receiver magnet is ejected and the second timer 169 resets, the first recording pen 101 dwells at the starting position, which coincides with the reference line, and produces a line 182 which is parallel to the direction of movement of the chart paper 110. Similarly, the line 181 would be extended in a direction opposite to the direction of the movement of the chart paper 110 by the distance equal to the length of the line 182.

When the sensing switch 46 is closed by the second receiver magnet 12, which descended down the chute 31 into the gauging position, the second timer 169, which was preset to time out during the ejection of the gauged receiver magnet 12 and before the next receiver magnet 12 descends into the gauging position, will reset and reclose its holding contact 170 so that the gauging of the second receiver magnet 12 is repeated similarly to the gauging of the previous receiver magnet 12. At this time, the elements of the apparatus are in the operating positions illustrated in FIG. 7 and a line 183 is in the process of being inscribed by the first pen 101 on the chart paper 110 during the gauging of the second magnet 12. The maximum amplitude of the line 183 measuring from the reference line will not be necessarily equal to the maximum amplitude of the line 177, but may be smaller or greater than the maximum amplitude of the line 177, depending on the relative depths of the counterbores 14—14 of the first and the second of the receiver magnets 12—12. While the first recording pen 101 traces the line 183, the second recording pen 102 traces an inclined line 184, the maximum amplitude of which, measuring from the reference line, is equal to one fifth of the sum of the maximum amplitudes of the traces 176 and 183. The gauging operation of the second receiver magnet 12 is then continued in the manner described with respect to the first receiver magnet.

The gauging operation then is repeated for the remaining receiver magnets 12—12 of the group of the five receiver magnets placed originally in the chute 31, the operation of the gauging operation for each of the receiver magnets being substantially a repetition of the gauging operation explained hereinabove with respect to the first magnet 12.

In view of the above-described operation, it is obvious that the reciprocating movement of the gauging element 49 is transformed into the oscillatory movement of the output shaft 93 of the servomotor 92, which in turn is transformed into directly proportional reciprocating movement of the first recording pen 101 and into the unidirectional movement of the second recording pen 102. The reciprocating movement of the first recording pen 101 is, therefore, recorded on the chart paper 110, continuously moving at the constant speed past the recording pen 101, as a plurality of saw-tooth-like segmental traces, such as traces designated generally by the numerals 188 to 192, inclusive, each having its maximum amplitude denoted by the line 179 and lines 193 to 196, inclusive, respectively. The unidirectional movement of the second recording pen 102 relative to the chart paper 110 is recorded as a stepped trace, designated generally by the numeral 197, each step of which relates to a corresponding one of the saw-tooth-like segmental traces 188 to 192, inclusive.

When the last of the five receiver magnets 12—12 has been measured and ejected, the actuating arm 44 of the normally open switch 46 will remain unactuated by a receiver magnet and, therefore, the second timer 169 will not reset itself. The first timer 162 is set to run for a period of time equal to the time required to measure the group of five receiver magnets 12—12 and then time out by opening its contact 163. Simultaneously, the contact 164 opens to deenergize the recorder motor 166 and the brake solenoid 140. Since the clutch solenoid 127 is deenergized at this time, the weight 143, due to gravitational forces exerted thereon, descends down the well 144 of the block 146 and imparts reverse rotation to the sprocket 148. Rotating motion of the sprocket 148 is transferred, through the left-hand shaft 131, the sprockets 133 and 134 and the ball chain 132, into a linear motion of the bearing guide 104 whereby the bearing guide is moved along the guide shaft 107 until the guide 104 strikes the collar 149. This movement of the bearing guide 104 moves the pen 102 back to its starting position, shown in phantom lines in FIG. 7, so that a line similar to a line 198 is produced by the second recording pen 102 on the chart paper 110 held stationary at this time.

The operator then can insert a new group of five receiver magnets 12—12 into the chute 31 so that the actuating arm 44 of the sensing switch 46 is depressed again. The whole sequence of operations of gauging the new series of the five receiver magnets 12—12 may be started by the operator by depressing the start switch 161 to energize the first timer 162.

Figure 10:
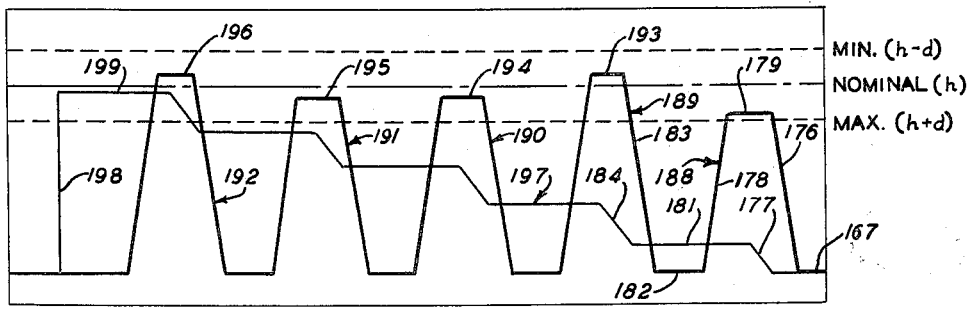
FIG. 10 is a development view of a chart illustrating measurements of a group of five articles.

At the beginning of the gauging operation of the second group of the magnets 12—12, the operator can observe, through the window 26, the saw-tooth-like segmental traces 188 to 192, inclusive, and the stepped trace 197 traced during the gauging operation of the first group of the receiver magnets 12—12, as is illustrated in FIG. 10. The limit of the maximum allowable depth of the counterbores 14—14 of the receiver magnets 12—12 is represented in FIG. 10 by the dashed line designated maximum $(h+d)$ which corresponds with the line 153 on the overlay plate 151. The limit of the minimum allowable depth of the counterbores 14—14 of the receiver magnets 12—12 is represented by the dashed line designated minimum $(h-d)$ which corresponds with the line 154 on the overlay plate 151. The nominal depth is represented by the line designated nominal $(h)$, which corresponds to the line 155 on the overlay plate 151, where the lines 153 and 154 delineate the boundaries of the allowable limits of tolerances of the depth of the counterbores 14—14 of the receiver magnets 12—12.

The deviations of the depths of the counterbores 14—14 of the individual receiver magnets 12—12 from the nominal depth $(h)$ thereof, are represented by the distances between the nominal depth line and the lines 179 and 193 to 196, inclusive, of the saw-tooth-like segmental traces 188 to 192, inclusive, respectively, representing individual receiver magnets 12—12. The operator, by looking at any of the saw-tooth-like segmental traces 188 to 192, inclusive, may determine, at a glance, whether any of the individual receiver magnets 12—12 are within the allowable tolerances of the dimension $(h\pm d)$, and the direction of deviation of each of the measurements of the depths of counterbores 14—14 from the nominal depth $(h)$ thereof.

A line 199 of the stepped trace 197, traced at the end of the measurement of the fifth receiver magnet 12 parallel to the reference line, is a graphical presentation of the average of the maximum amplitudes of the five saw-tooth-like segmental traces 188 to 192, inclusive. The amplitude of the line 199 of the stepped trace 197 is equal to one fifth of the sum of the maximum amplitudes of the five saw-tooth-like segmental traces 188 to 192, inclusive. Therefore, the distance between the line 199 and the line representing the nominal depth $(h)$ of the receiver magnets 12—12, represents the average deviation of the depth of the counterbores 14—14 of all five receiver magnets 12—12 from the nominal depth $(h)$ thereof. In the particular example illustrated in FIG. 10, the operator, by looking at the line 199 of the stepped trace 197, could observe that the measurements of the first group of five receiver magnets 12—12 tend to drift toward the maximum depth, and the error can be corrected by controlling the process of manufacture of the receiver magnets 12—12, for example, by adjusting a grinder in a finishing machine, before large numbers of the receiver magnets having undesirable characteristics have been produced.

It is apparent that the apparatus described in the foregoing example, may be modified to measure the dimensions and to record the measurements of any other series of articles, e.g. ten, by modifying the ratio of the diameters of the sprockets 122 and 123 accordingly, or by modifying the ratio of the diameters of the sprockets of the ball chain and sprocket drive 129. It will be understood that the timers 162 and 169 should be adjusted accordingly. The second recording pen 102 then will trace a stepped trace, maximum amplitude of which will be equal to 1/Xth of the sum of all maximum amplitudes of each saw-tooth-like segmental trace traced by the first recording pen 101 for the group of X receiver magnets.

It is manifest that this invention is not limited to the specific details described in connection with the above embodiment of the invention, but that various modifications may be made without departing from the spirit and scope thereof.

What is claimed is:

1. Gauging and recording apparatus, which comprises gauging means for making a predetermined series of individual measurements, first means responsive to said gauging means for recording a series of individual indicia, the indicia providing a visual indicaton of the corresponding individual measurements, and second means actuated by the first recording means for recording at the completion of the series of measurements an indicium providing a visual indication of the mean of said individual measurements.

2. Gauging and recording apparatus, which comprises gauging means for making a predetermined series of individual measurements, first means responsive to said gauging means for recording a series of individual indicia, the indicia providing a visual indication of the corresponding individual measurements, and second means operated intermittently by said first recording means for recording at the completion of the series of measurements an indicium providing a visual indication of the mean of said individual measurements.

3. Gauging and recording apparatus, which comprises means for making a predetermined series of individual measurements, first recording means, first drive means responsive to said gauging means for driving said first recording means to record a series of individual indicia, the indicia providing a visual indication of the corresponding individual measurements, second recording means, and second drive means driven intermittently by said first drive means for driving said second recording means so that a visible indicium denotative of the mean of said individual measurements is recorded at the completion of the series of measurements.

4. Apparatus for gauging a desired dimension of each of a series of a predetermined number of articles and for graphically recording the dimensions individually and the mean of the series of the individual dimensions, which comprises a gauging head having a reference surface and a gauging element movable relative to said reference surface between a position normally assumed by said gauging element and positions determined by the respective dimensions, the maximum amount of movement of the gauging element relative to the reference surface during gauging of each article being related directly to the respective dimension of the article being gauged, first recording means responsive to the amount of movement at any instant of said gauging element relative to said reference surface for recording a series of individual indicia, the indicia providing a visual indication of the corresponding individual dimension, and second recording means actuated intermittently by the first recording means for recording at the completion of the gauging of said series an indicium providing a visual indication of the mean of said individual dimensions.

5. Apparatus for making a series of a predetermined number of measurements of articles and for graphically recording the measurements individually and the mean of the series of the individual measurements, which comprises a gauging head having a reference surface and a gauging element for contacting a predetermined portion of the article, which element is movable relative to said reference surface from a position normally assumed by said gauging element to positions determined by the respective measurements, the relative distance between the reference surface and the contacting portion of the gauging element being related directly to the respective measurement, first recording means movable between a normal position assumed thereby on an imaginary reference line and positions indicative of the respective measurements, drive means responsive to the movement of said gauging element relative to said reference surface for driving said first recording means to record a series of individual indicia, the indicia providing a visual indication of the corresponding individual measurements, and second recording means actuated intermittently by said drive means so that a visual indicium denotative of the mean of said individual measurements is recorded at the completion of the series of measurements.

6. Apparatus for making a series of a predetermined number of measurements of articles and for graphically recording the measurements individually and the mean of the series of the individual measurements, which comprises a gauging head having a reference surface and a gauging element for contacting a predetermined portion of the article, which gauging element is movable relative to said reference surface from a position normally assumed by said gauging element to positions determined by the respective measurements, the relative distance between the reference surface and the contacting portion of the gauging element being related directly to the respective measurement, first recording means movable between a normal position assumed thereby on an imaginary reference line and positions indicative of the respective measurements, first drive means responsive to the movement of said gauging element relative to said reference surface for driving said first recording means to record a series of individual indicia, the indicia providing a visual indication of the corresponding individual measurements, second recording means movable between a normal position assumed thereby at the beginning of the series of the measurements and a position corresponding to the mean of said series of the individual measurements, and second drive means driven intermittently during the series of said individual measurements by said first drive means for driving the second recording means to record a visual indicium denotative of the mean of said individual measurements at the completion of the series of the measurements.

7. Apparatus for making a series of a predetermined number of measurements of articles and for graphically recording the measurements individually and the mean of the series of the individual measurements, which comprises a gauging head having a reference surface and a gauging element for contacting a predetermined portion of the article, which gauging element is movable relative to said reference surface from a position normally assumed by said gauging element to positions determined by the respective measurements, the relative distance between the reference surface and the contacting portion of the gauging element being related directly to the respective measurement, first recording means movable between a normal position assumed thereby on an imaginary reference line and positions indicative of the respective measurements, drive means responsive to the movement of said gauging element relative to said reference surface for driving said first recording means to record a series of individual indicia, the indicia providing a visual indication of the corresponding individual measurements, second recording means actuated intermittently by said drive means and driven unidirectionally between a normal position thereof with respect to the reference line and a position corresponding to the mean of the series of the measurements so that a visual indicium denotative of the mean of said individual measurements is recorded at the completion of the series of the measurements, and means for resetting said second recording means after the completion of the series of the measurements back to the normal position thereof on the reference line.

8. Apparatus for making a series of a predetermined number of measurements of articles and for graphically recording the measurements individually and the mean of the series of the individual measurements, which comprises a gauging head having a reference surface and a gauging element for contacting a predetermined portion of the article, which gauging element is movable relative to said reference surface from a position normally assumed by said gauging element to positions determined by the respective measurements, the relative distance between the reference surface and the contacting portion of the gauging element being related directly to the respective measurement, first recording means movable between a normal position assumed thereby on an imaginary reference line and positions indicative of the respective measurements, first drive means responsive to the movement of said gauging element relative to said reference surface for driving said first recording means to record a series of individual indicia, the indicia providing a visual indication of the corresponding individual measurements, second recording means movable during the series of the individual measurements between a normal position assumed thereby at the beginning of the series of the measurements and a position corresponding to the mean of said series of the individual measurements, second drive means driven intermittently during the series of said individual measurements by said first drive means for driving the second recording means unidirectionally to record at the completion of the series of the measurements a visual indicium denotative of the mean of said individual measurements, means for resetting said second recording means to the normal position thereof on the reference line, said resetting means tending continuously to reset said second recording means during the entire series of the measurements, and means for resistively retaining said second recording means in positions intermediate said normal position thereof and the position corresponding to the mean of said individual measurements against the resetting tendency of said resetting means, said retaining means being designed to permit said resetting means to reset said second recording means back to the normal position thereof after said second recording means records said indicium.

9. Apparatus for gauging a desired dimension of each of a series of X articles and for graphically recording individual measurements and the mean of the series of measurements, which comprises a reciprocable gauging head having a reference surface and a gauging element engageable with the articles being measured, means for periodically reciprocating the gauging head between a retracted position and an extended position relative to the articles to be gauged so that the reference surface will move into and out of contact with successive articles of the series, said gauging element being so constructed and designed that movement of the reference surface into contact with the article causes relative displacement of a portion of the gauging element contacting the articles with respect to the reference surface from a position normally assumed by the gauging element when the gauging head is in the retracted position, the distance between the contacting portion of the gauging element and the reference surface being related directly to the dimension of an article being gauged, first recording means responsive to the instantaneous displacement of the contacting portion of the gauging element relative to the reference surface for recording a series of X saw-tooth-like segmental traces the amplitudes of which relate directly to the respective displacements of the gauging element during successive cycles of the reciprocating gauging head, the maximum amplitude of each of said saw-tooth-like segmental traces with respect to a reference line providing a visual indication of the dimension of the corresponding article, and second recording means actuated intermittently by the first recording means for recording a stepped trace beginning on said reference line and progressing in successive steps, the maximum amplitude of each successive step with respect to the reference line being equal to 1/Xth the sum of the maximum amplitudes of the existing saw-tooth-like segmental traces so that the amplitude of the Xth step of said stepped trace with respect to the reference line provides a visual indication of the mean dimension of the X articles.

10. Apparatus for gauging a desired dimension of each of a series of X articles and for graphically recording individual measurements and the mean of the series of measurements, which comprises a reciprocable gauging head having a reference surface and a gauging element engageable with the articles being measured, means for restricting the amount of displacement of the contacting portion of the gauging element relative to the reference surface, means for periodically reciprocating the gauging head between a retracted position and an extended position relative to the articles to be gauged so that the reference surface will move into and out of contact with successive articles of the series, said gauging element being so constructed and designed that movement of the reference surface into contact with the article causes relative displacement of a portion of the gauging element contacting the articles with respect to the reference surface from a position normally assumed by the gauging element when the gauging head is in the retracted position, the distance between the contacting portion of the gauging element and the reference surface being related directly to the dimension of an article being gauged, resilient means for tending to maintain said gauging element in a normal position relative to said reference surface, first recording means responsive to the instantaneous displacement of the contacting portion of the gauging element relative to the reference surface for recording a series of X saw-tooth-like segmental traces the amplitudes of which relate directly to the respective displacements of the gauging element during successive cycles of the reciprocating gauging head, the maximum amplitude of each of said saw-tooth-like segmental traces with respect to a reference line providing a visual indication of the dimension of the corresponding article, and second recording means actuated intermittently by the first recording means for recording a stepped trace beginning on said reference line and progressing in successive steps, the maximum amplitude of each successive step with respect to the reference line being equal to 1/Xth the sum of the maximum amplitudes of the existing saw-tooth-like segmental traces, so that the amplitude of the Xth step of said stepped trace with respect to the reference line provides a visual indication of the mean dimension of the X articles.

11. Apparatus for gauging a desired dimension of each of a series of X articles and for graphically recording individual measurements and the mean of the series of measurements, which comprises a reciprocable gauging head having a reference surface and a gauging element engageable with the articles being measured, means for feeding successive articles of the series adjacent to the gauging head, means for periodically reciprocating the gauging head between a retracted position and an extended position relative to the articles to be gauged so that the reference surface will move into and out of contact with successive articles of the series, said gauging element being so constructed and designed that movement of the reference surface into contact with the article causes relative displacement of the portion of the gauging element contacting the articles with respect to the reference surface from a position normally assumed by the element when the gauging head is in the retracted position, the distance between a contacting portion of the gauging element and the reference surface being proportional to the dimension of an article being gauged, a recording medium, a first recording pen, a second recording pen, first means for supporting said first recording pen in contact with said recording medium, second means for supporting said second recording pen in contact with said recording medium, first driven means for moving said first recording pen relative to said recording medium, second driven means for moving said second recording pen relative to said recording medium, drive means actuatable for driving said first driven means, means responsive to the instantaneous displacement of the contacting portion of the gauging element relative to said reference surface during the measuring of the dimension of each individual article in the series for actuating said drive means proportionally to the relative movement of the gauging element so that said first recording pen is moved relative to said recording medium between a normal position on an imaginary reference line on the recording medium corresponding to the normal position of the gauging element and positions indicative of the measured dimensions of the respective articles and records a series of X saw-tooth-like segmental traces, each of the traces corresponding to the movement of the contacting portion of the gauging element relative to the reference surface during one respective successive cycle of the reciprocating gauging head, means for intermittently connecting said first driven means operatively to said second driven means whereby said second recording pen is moved during the measurements of the series of the X articles unidirectionally between a normal position of said second recording pen with respect to the reference line and a position indicative of the mean of said individual measurements so that said second recording pen records a stepped trace beginning on said reference line and progressing in successive steps, the maximum amplitude of each successive step with respect to the reference line being equal to 1/Xth the sum of the maximum amplitudes of the existing saw-tooth-like segmental traces, so that the amplitude of the Xth step of said stepped trace with respect to the reference line provides a visual indication of the mean dimension of the X articles, means connected operatively to said second driven means for resetting said second recording pen to its normal position, said resetting means tending continuously to reset said second recording pen during the whole series of the measurements, and means for resisting said resetting tendency of said resetting means for retaining said second recording pen in positions intermediate said normal position thereof and in a position indicative of the mean of said individual measurements, said resisting means being designed to permit said resetting means to reset said second recording pen back to its normal position after the completion of the series of measurements of the X articles.

12. Apparatus for gauging a desired dimension of each of a series of X articles and for graphically recording individual measurements and the mean of the series of measurements, which comprises a reciprocable gauging head having a reference surface and a gauging element engageable with the articles being measured, means for feeding successive articles of the series into a gauging position adjacent to the gauging head, means for sensing the presence of an article in the gauging position, means for periodically reciprocating the gauging head between a retracted position and an extended position relative to the successive articles in the gauging position so that the reference surface will move into and out of contact with successive articles of the series, said gauging head being so constructed and designed that movement of the reference surface into contact with the article being gauged causes relative displacement of the portion of the gauging element contacting the article with respect to the reference surface from a position normally assumed by the element when the gauging head is in the retracted position, the distance between a contacting portion of the gauging element and the reference surface being related directly to the dimension of the article being gauged, a recording medium, a first guide rod, a first bearing support mounted slidably on said first guide rod, a first recording pen mounted adjustably in said first bearing support in contact with said recording medium for reciprocating movement with respect thereto, a second guide rod, a second bearing support mounted slidably on said second guide rod, a second recording pen mounted adjustably in said second bearing support in contact with said recording medium for reciprocating movement with respect thereto, means for moving the recording medium with respect to the recording pens, a first drive coupling connected operatively to the first bearing support, a second drive coupling connected operatively to the second bearing support including a speed reduction device, a servomotor connected operatively to said first drive coupling, a transducer responsive to the displacement of the contacting portion of the gauging element relative to said reference surface during the measuring of the dimension of each individual article in the series for actuating said servomotor proportionally to the relative movement of the gauging element so that said first recording pen is moved relative to said recording medium between a normal position on an imaginary reference line on the recording medium and positions indicative of the measured dimensions of the respective articles and records a series of X saw-tooth-like segmental traces, a clutch for intermittently connecting said first drive coupling operatively to said second drive coupling whereby said second recording pen is moved unidirectionally during the measuring of the series of the X articles between a normal position of said second recording pen on the reference line and a position indicative of the mean of said individual measurements so that said second recording pen records a stepped trace beginning on said reference line and progressing in successive steps, the maximum amplitude of each successive step with respect to the reference line being equal to 1/Xth the sum of the maximum amplitudes of the existing saw-tooth-like segmental traces, so that the amplitude of the Xth step of said stepped trace with respect to the reference line provides a visual indication of the mean dimension of the X articles, a weight connected operatively to said second drive coupling for applying a constant force to the second drive coupling tending to reset said second recording pen to its normal position, and a brake actuated during the measuring of the series of articles for resisting said resetting tendency of said resetting weight for retaining said second recording pen in successive positions intermediate said normal position thereof and in a final position indicative of the mean of said individual measurements, said brake being designed to be deactuated at the end of the measurement of said series to permit said resetting weight to reset said second recording pen back to the reference line after the completion of the series of measurements of the X articles.

References Cited in the file of this patent

UNITED STATES PATENTS

| | | |
|---|---|---|
| 2,021,218 | Ballard | Nov. 19, 1935 |
| 2,596,696 | Knobel | May 13, 1952 |
| 2,699,701 | Strother et al. | Jan. 18, 1955 |